US011912959B2

(12) United States Patent
Staubach et al.

(10) Patent No.: US 11,912,959 B2
(45) Date of Patent: Feb. 27, 2024

(54) BORON-FREE IMPREGNATING SOLUTION FOR A WICK AND BORON-FREE WICK

(71) Applicant: SCHREIBER GMBH, Fulda (DE)

(72) Inventors: Carsten Staubach, Fulda (DE); Lukas Staubach, Fulda (DE); Norbert Staubach, Fulda (DE)

(73) Assignee: SCHREIBER GMBH, Fulda (DE)

( * ) Notice: Subject to any disclaimer, the term of this patent is extended or adjusted under 35 U.S.C. 154(b) by 106 days.

(21) Appl. No.: 17/608,119

(22) PCT Filed: Apr. 30, 2020

(86) PCT No.: PCT/EP2020/062080
§ 371 (c)(1),
(2) Date: Nov. 1, 2021

(87) PCT Pub. No.: WO2020/221881
PCT Pub. Date: Nov. 5, 2020

(65) Prior Publication Data
US 2022/0220415 A1  Jul. 14, 2022

(30) Foreign Application Priority Data
Apr. 30, 2019 (EP) .................................... 19171887

(51) Int. Cl.
C11C 5/00 (2006.01)
C09K 21/02 (2006.01)
C09K 21/04 (2006.01)
F21V 37/00 (2006.01)

(52) U.S. Cl.
CPC .............. C11C 5/006 (2013.01); C09K 21/02 (2013.01); C09K 21/04 (2013.01); F21V 37/002 (2013.01)

(58) Field of Classification Search
CPC ......... C09K 21/02; C09K 21/04; C11C 5/002; C11C 5/006; F21V 37/002
See application file for complete search history.

(56) References Cited

U.S. PATENT DOCUMENTS

| 3,291,560 | A | 12/1966 | Machell et al. |
| 3,940,233 | A | 2/1976 | Fox et al. |
| 9,920,250 | B1 | 3/2018 | Vuozzo |
| 2006/0147862 | A1* | 7/2006 | Bell .......................... F23D 3/18 431/325 |
| 2010/0239642 | A1 | 9/2010 | Campbell et al. |

FOREIGN PATENT DOCUMENTS

| CN | 101094952 A | 12/2007 | |
| CN | 101880204 A | 11/2010 | |
| CN | 101451091 B | 7/2011 | |
| CN | 104327862 A | 2/2015 | |
| CN | 105541434 A | 5/2016 | |
| CN | 107937145 A | 4/2018 | |
| CN | 110064159 A | 7/2019 | |
| DE | 1444052 A1 | 7/1969 | |
| FR | 2547313 A * | 12/1984 | ............. C11C 5/006 |
| WO | 9600763 A1 | 1/1996 | |
| WO | WO-9600763 A1 * | 1/1996 | ............... B27K 3/52 |
| WO | 1997035819 A1 | 10/1997 | |
| WO | 2017220410 A1 | 12/2017 | |
| WO | 2020221881 A2 | 11/2020 | |

OTHER PUBLICATIONS

English-language machine translation of FR 2547313 A (Year: 1984).*
International Search Report for related International Patent Application No. PCT/EP2020/062080, dated Nov. 18, 2020, 14 pages.
Office Action for related International Application No. PCT/EP2020/062080, dated Nov. 4, 2021, 8 pages.
Office Action for related Brazilian Application No. BR112021021619-7, dated Sep. 26, 2023, 6 pages.

* cited by examiner

*Primary Examiner* — James C Goloboy
(74) *Attorney, Agent, or Firm* — DITTHAVONG, STEINER, & MLOTKOWSKI

(57) ABSTRACT

The invention relates to a boron-free impregnating solution for a wick, a boron-free wick, and a candle comprising a wick according to the invention. The invention further relates to a method for impregnating a wick with an impregnating solution according to the invention.

13 Claims, No Drawings

BORON-FREE IMPREGNATING SOLUTION FOR A WICK AND BORON-FREE WICK

The present invention relates to a boron-free impregnating solution for a wick, a boron-free wick, and a candle comprising a wick according to the invention. The invention further relates to a method for impregnating a wick with an impregnating solution according to the invention.

Wicks for candles must intrinsically combine various properties. First, said wicks must demonstrate good burning behavior, without, however, burning up too quickly. Second, the angle of curvature of the wick must be within a specified range in order to be able to produce corresponding flame sizes and shapes.

In order to achieve said properties, various substances having influence on the burning behavior are added to wicks. One important constituent is a flame retardant for preventing too rapid burning. Substances are further used for influencing further properties of the wick. The interaction of all components is important in the present case in order to obtain a wick comprising a corresponding curvature and advantageous burning behavior.

Substances comprising boron, such as boric acid, borate, or borax are known from the prior art and are used as flame retardants. Said substances produce advantageous burning behavior of the wick. The wick also has an advantageous curvature.

Borates and particularly borax can have negative health effects and are classified as hazardous to reproductive health. This means that wicks impregnated with such substances are currently no longer desirable.

It is therefore of interest to produce preparation solutions for wicks, also known as impregnating solutions, having no health concerns and nevertheless comprising the advantageous burning and curvature properties of conventional wicks comprising boron and particularly borates.

The object of the present invention is therefore to provide impregnating solutions for wicks and wicks free of boron. A simultaneous, further object of the invention is to provide wicks having good burning properties and good curvature behavior.

The present object is achieved by the impregnating solution according to the invention according to claim 1. The present invention further relates to a boron-free wick according to claim 6. The present invention further relates to candles according to claim 10 comprising the wick according to the invention.

A further object of the invention relates to a method according to claim 12 used for impregnating wicks with an impregnating solution according to the invention.

The present invention relates to a boron-free impregnating solution for a wick, comprising, preferably having
a) a solvent;
b) at least one first flame retardant; and
c) at least one first additive, the first additive being selected from the group consisting of ammonium nitrate, cerium nitrate, a polymer, or combinations thereof.

Impregnating solutions are also referred to a preparation solutions.

The impregnating solution according to the invention avoids adding substances comprising boron, particularly borates, and here particularly borax. Borates and particularly borax are on a list of particularly concerning substances.

The impregnating solution according to the invention is also environmentally friendly and eliminates hazardous materials. The impregnating solution is further partially biodegradable. The boron-free impregnating solution further positively influences the burning behavior of wicks.

The solvent of the boron-free impregnating solution is preferably water. When water is used as the solvent, said solvent can comprise traces of substances dissolved therein. Demineralized water is preferably used as the solvent.

At least one first flame retardant is further used in the boron-free impregnating solution according to the invention. A flame retardant prevents the wick from disintegrating. Disintegrating is understood here to be what is known as smoldering, that is, burning down the wick as the candle burns down. The flame retardant is therefore responsible according to the present invention for the advantageous burning behavior, wherein substances comprising boron and hazardous to health can simultaneously be eliminated.

Flame retardants according to the invention in the sense of the invention are all flame retardants known to the person skilled in the art, suitable for use in impregnating solutions in wicks, and boron-free.

The at least one first flame retardant is preferably selected from the group consisting of inorganic, phosphorous substances, phosphates, organic phosphorus compounds, nitrogen compounds, silicic acid, and combinations thereof. The at least one flame retardant is preferably a phosphorous, inorganic substance.

The phosphates are preferably selected from inorganic and organic phosphates, preferably from dihydrogen phosphates, hydrogen phosphates, polyphosphates, and/or combinations thereof, more preferably from ammonium dihydrogen phosphate, ammonium polyphosphate, and/or combinations thereof.

The at least one first flame retardant is particularly preferably polyphosphoric acid and/or polyphosphate, and most preferably ammonium polyphosphate.

The organic phosphorus compounds are preferably ammonium salts of organic phosphorus compounds.

The nitrogen compounds are preferably selected from inorganic nitrogen compounds, organic nitrogen compounds, and/or combinations thereof, preferably from inorganic nitrogen compounds.

The impregnating solution according to the invention further comprises an inorganic sulfate selected from the group consisting of lithium sulfate, beryllium sulfate, sodium sulfate, ammonium sulfate, magnesium sulfate, aluminum sulfate, potassium sulfate, and calcium sulfate. The inorganic sulfate is preferably selected from the group consisting of sodium sulfate, magnesium sulfate, or ammonium sulfate, and the inorganic sulfate is more preferably ammonium sulfate.

The impregnating solution according to the invention preferably comprises sulfuric acid.

The impregnating solution according to the invention further preferably comprises inorganic sulfate, inorganic hydrogen sulfate, and/or sulfuric acid.

According to an advantageous embodiment, the boron-free impregnating solution for a wick comprises, and preferably consists of,
a) a solvent;
b) at least one first flame retardant;
c) at least one first additive, the first additive being selected from the group consisting of ammonium nitrate, cerium nitrate, a polymer, or combinations thereof; and
d) an inorganic sulfate selected from the group consisting of lithium sulfate, beryllium sulfate, sodium sulfate, ammonium sulfate, magnesium sulfate, aluminum sulfate, potassium sulfate, and calcium sulfate.

The boron-free impregnating solution according to the invention further comprises at least one first additive. The first additive can be selected from the group consisting of ammonium nitrate, cerium nitrate, potassium nitrate, magnesium hydroxide, ammonium hydroxide, aluminum hydroxide, urea, a polymer, or combinations thereof. The at least one first additive is preferably selected from ammonium nitrate or cerium nitrate, and the first additive is more preferably cerium nitrate.

When the first additive is a polymer, then the polymer is preferably an organic polymer. The organic polymer is preferably a polyethylene glycol, a polyacrylate, or a vinyl-based polymer. The polymers can be homopolymers or copolymers and can comprise further monomers, such as mono- or diunsaturated monomers such as ethylene, propylene, and/or butadiene.

The polymer can also be multivalent, and the polymer is preferably di-, tri-, and/or tetravalent.

According to a further embodiment, the impregnating solution comprises a second flame retardant potentially selected from the flame retardants listed above. The at least one first and the second flame retardant are different from each other in the present case.

The boron-free impregnating solution preferably comprises a second additive, wherein the second additive is an inorganic nitrate, and the second additive is preferably selected from the group consisting of ammonium nitrate or cerium nitrate, wherein the second additive is different from the first additive. The second additive is more preferably ammonium nitrate.

According to a preferred embodiment, the at least one first additive is cerium nitrate and the second additive is ammonium nitrate.

The impregnating solution according to the invention further preferably comprises a further, third additive. The third additive is preferably selected from the group consisting of magnesium hydroxide, ammonium hydroxide, aluminum hydroxide, urea, sulfur, organic sulfur compounds, inorganic sulfur compounds, and/or combinations thereof, preferably selected from the group consisting of sulfur, organic sulfur compounds, and inorganic sulfur compounds, and the third additive is more preferably sulfur.

The impregnating solution according to the invention can comprise further additives.

The proportion of inorganic sulfate is preferably from 0.1 to 20 weight %, preferably 0.1 to 10 weight %, more preferably 0.3 to 9 weight %, still more preferably 0.3 to 6.0 weight %, and still more preferably 0.4 to 4.0 weight % relative to the total amount of boron-free impregnating solution.

According to an advantageous embodiment, the boron-free impregnating solution for a wick comprises, and preferably consists of,
  a) a solvent;
  b) at least one first flame retardant; and
  c) at least one first additive, the first additive being selected from the group consisting of ammonium nitrate, cerium nitrate, a polymer, or combinations thereof; and
  d) an inorganic sulfate selected from the group consisting of lithium sulfate, beryllium sulfate, sodium sulfate, ammonium sulfate, magnesium sulfate, aluminum sulfate, potassium sulfate, and calcium sulfate, wherein the proportion of inorganic sulfate is from 0.1 to 20 weight %, preferably 0.3 to 9 weight %, and more preferably 0.4 to 4.0 weight % relative to the total amount of impregnating solution.

The proportion of first additive is further preferably from 0.1 to 10 weight %, preferably 0.1 to 4.0 weight %, more preferably 0.15 to 3.8 weight %, and still more preferably 0.2 to 3.6 weight % relative to the total amount of impregnating solution.

According to a further advantageous embodiment, the boron-free impregnating solution for a wick comprises, and preferably consists of,
  a) a solvent;
  b) at least one first flame retardant; and
  c) at least one first additive, the first additive being selected from the group consisting of ammonium nitrate, cerium nitrate, a polymer, or combinations thereof, wherein the proportion of the first additive is 0.1 to 10 weight %, preferably 0.1 to 4.0 weight %, and more preferably 0.2 to 3.6 weight % relative to the total amount of impregnating solution.

According to a further advantageous embodiment, the boron-free impregnating solution for a wick comprises, and preferably consists of,
  a) a solvent;
  b) at least one first flame retardant;
  c) at least one first additive, the first additive being selected from the group consisting of ammonium nitrate, cerium nitrate, a polymer, or combinations thereof, wherein the proportion of the first additive is 0.1 to 10 weight %, preferably 0.1 to 4.0 weight %, and more preferably 0.2 to 3.6 weight % relative to the total amount of impregnating solution; and
  d) an inorganic sulfate selected from the group consisting of lithium sulfate, beryllium sulfate, sodium sulfate, ammonium sulfate, magnesium sulfate, aluminum sulfate, potassium sulfate, and calcium sulfate, wherein the proportion of inorganic sulfate is from 0.1 to 20 weight %, preferably 0.3 to 9 weight %, and more preferably 0.4 to 4.0 weight % relative to the total amount of impregnating solution.

A further object of the invention relates to a boron-free wick comprising, and preferably consisting of,
  a) a wick material, the wick material being selected from cotton, rayon staple, cellulose fibers, paper yarn, linen yarn, and/or combinations thereof;
  b) at least one first flame retardant; and
  c) at least one first additive, the first additive being selected from the group consisting of ammonium nitrate, cerium nitrate, a polymer, or combinations thereof.

The wick is made of a wick material. Said wick material forms the base material and is impregnated with the impregnating solution. All materials known to the person skilled in the art can be considered as wick materials. The wick material is preferably selected from cotton, rayon staple, cellulose fibers, paper yarn, linen yarn, and/or combinations thereof.

The boron-free wick is preferably obtained by impregnating a wick material with the impregnating solution according to the invention.

After drying, a boron-free wick is obtained, said wick being free of water, but comprising the substances present in the impregnating solution according to the invention.

The information provided above for the impregnating solution according to the invention applies accordingly to the boron-free wick as well.

The boron-free wick comprises at least one first flame retardant.

Flame retardants according to the invention are all flame retardants known to the person skilled in the art, suitable for use in wicks, and boron-free.

The at least one first flame retardant is preferably selected from the group consisting of inorganic, phosphorous substances, phosphates, organic phosphorus compounds, nitrogen compounds, silicic acid, and combinations thereof. The at least one flame retardant is preferably a phosphorous, inorganic substance.

The phosphates are preferably selected from inorganic and organic phosphates, preferably from dihydrogen phosphates, hydrogen phosphates, polyphosphates, and/or combinations thereof, more preferably from ammonium dihydrogen phosphate, ammonium polyphosphate, and/or combinations thereof. The at least one first flame retardant is particularly preferably polyphosphoric acid and/or polyphosphate, and most preferably ammonium polyphosphate.

The organic phosphorus compounds are preferably ammonium salts of organic phosphorus compounds.

The nitrogen compounds are preferably selected from inorganic nitrogen compounds, organic nitrogen compounds, and/or combinations thereof, preferably from inorganic nitrogen compounds.

The wick according to the invention further comprises an inorganic sulfate selected from the group consisting of lithium sulfate, beryllium sulfate, sodium sulfate, ammonium sulfate, aluminum sulfate, magnesium sulfate, potassium sulfate, and calcium sulfate. The inorganic sulfate is preferably selected from the group consisting of sodium sulfate, magnesium sulfate, or ammonium sulfate, and the inorganic sulfate is more preferably ammonium sulfate.

The wick according to the invention further preferably comprises inorganic sulfate, inorganic hydrogen sulfate, and/or sulfuric acid. The wick preferably comprises inorganic sulfate and/or inorganic hydrogen sulfate.

The proportion of inorganic sulfate is preferably from 0.001 to 10 weight %, preferably 0.01 to 5 weight %, and more preferably 0.1 to 2.5 weight % relative to the total amount of the wick.

According to an advantageous embodiment, the boron-free wick comprises, and preferably consists of,
a) a wick material, the wick material being selected from cotton, rayon staple, cellulose fibers, paper yarn, linen yarn, and/or combinations thereof;
b) at least one first flame retardant;
c) at least one first additive, the first additive being selected from the group consisting of ammonium nitrate, cerium nitrate, a polymer, or combinations thereof; and
d) an inorganic sulfate selected from the group consisting of lithium sulfate, beryllium sulfate, sodium sulfate, ammonium sulfate, magnesium sulfate, aluminum sulfate, potassium sulfate, and calcium sulfate.

The boron-free wick according to the invention further comprises at least one first additive. The first additive can be selected from the group consisting of ammonium nitrate, cerium nitrate, potassium nitrate, magnesium hydroxide, ammonium hydroxide, aluminum hydroxide, urea, a polymer, or combinations thereof. The at least one first additive is preferably selected from ammonium nitrate or cerium nitrate, and the first additive is more preferably cerium nitrate.

When the first additive is a polymer, then the polymer is preferably an organic polymer. The organic polymer is preferably a polyethylene glycol, a polyacrylate, or a vinyl-based polymer. The polymers can be homopolymers or copolymers and can comprise further monomers, such as mono- or diunsaturated monomers such as ethylene, propylene, and/or butadiene.

The polymer can also be multivalent, and the polymer is preferably di-, tri-, and/or tetravalent.

The proportion of the first additive is preferably 0.001 to 10 weight %, preferably 0.01 to 4.0 weight %, and more preferably 0.1 to 2.5 weight % relative to the total amount of the wick.

According to an advantageous embodiment, the boron-free wick comprises, and preferably consists of,
a) a wick material, the wick material being selected from cotton, rayon staple, cellulose fibers, paper yarn, linen yarn, and/or combinations thereof;
b) at least one first flame retardant;
c) at least one first additive, the first additive being selected from the group consisting of ammonium nitrate, cerium nitrate, a polymer, or combinations thereof, wherein the proportion of the first additive is 0.001 to 10 weight %, preferably 0.01 to 4.0 weight %, and more preferably 0.1 to 2.5 weight % relative to the total amount of the wick; and
d) optionally an inorganic sulfate selected from the group consisting of lithium sulfate, beryllium sulfate, sodium sulfate, ammonium sulfate, magnesium sulfate, aluminum sulfate, potassium sulfate, and calcium sulfate, wherein the proportion of inorganic sulfate is preferably from 0,001 to 10 weight %, preferably 0.01 to 5 weight %, and more preferably 0.1 to 2.5 weight % relative to the total amount of impregnating solution.

According to a further embodiment, the wick comprises a second flame retardant potentially selected from the flame retardants listed above. The at least one first and the second flame retardant are different from each other in the present case.

The boron-free wick preferably comprises a second additive, wherein the second additive is an inorganic nitrate, and the second additive is preferably selected from the group consisting of ammonium nitrate or cerium nitrate, wherein the second additive is different from the first additive. The second additive is more preferably ammonium nitrate.

According to a preferred embodiment, the at least one first additive is cerium nitrate and the second additive is ammonium nitrate.

The wick according to the invention further preferably comprises a further, third additive. The third additive is preferably selected from the group consisting of magnesium hydroxide, ammonium hydroxide, aluminum hydroxide, urea, sulfur, organic sulfur compounds, inorganic sulfur compounds, and/or combinations thereof, preferably selected from the group consisting of sulfur, organic sulfur compounds, and inorganic sulfur compound, and the third additive is more preferably sulfur.

The wick according to the invention can comprise further additives.

According to an advantageous embodiment, the boron-free wick comprises, and preferably consists of,
a) a wick material, the wick material being selected from cotton, rayon staple, cellulose fibers, paper yarn, linen yarn, and/or combinations thereof;
b) at least one first flame retardant;
c) at least one first additive, the first additive being selected from the group consisting of ammonium nitrate, cerium nitrate, a polymer, or combinations thereof; and
d) an inorganic sulfate selected from the group consisting of lithium sulfate, beryllium sulfate, sodium sulfate, ammonium sulfate, magnesium sulfate, aluminum sulfate, potassium sulfate, and calcium sulfate, wherein the proportion of inorganic sulfate is from 0,001 to 10 weight %, preferably 0.01 to 5 weight %, and more preferably 0.1 to 2.5 weight % relative to the total amount of impregnating solution.

The wick according to the invention can also additionally comprise a wick wax. The wick wax is regularly applied to the exterior of the wick after impregnating and drying.

The invention further relates to a candle comprising a wick according to the invention.

The information provided above for the impregnating solution according to the invention and the wick according to the invention applies accordingly to the candle according to the invention as well, where applicable.

A candle in the sense of the invention is a candle material comprising a wick.

Candle materials in the sense of the invention are substances used as the main burning material in a candle. The candle materials are selected from the group consisting of paraffin, stearin of animal and/or vegetable origin, beeswax, palm wax, soy wax, fats of animal or vegetable origin, and/or combinations thereof. The candle according to the invention can thus be made of various candle materials.

The candle according to the invention can further comprise additives such as fragrances, dyes, and/or combinations thereof.

The candle can have any shape known to the person skilled in the art, particularly a tea light, pillar, or taper.

The wick according to the invention is selected depending on the candle material used. The burning properties and the angle of curvature of the wick result from interaction with the particular candle material selected.

The invention further relates to a method for impregnating a wick with an impregnating solution, comprising the steps
  a) passing the wick through the impregnating solution at a speed of at least 100 m/min, preferably at least 140 m/min, and more preferably at least 180 m/min, wherein the dwell time of the wick in the impregnating solution is at least 0.5 seconds or more, preferably 0.7 seconds or more, and more preferably 0.8 seconds or more;
  b) winding up the impregnated wick onto a drying device.

By means of the method according to the invention, it is possible to impregnate a wide variety of wick materials sufficiently with an impregnating solution.

The method according to the invention allows extended dwell time of the wick in the impregnating solution. The impregnating solution can thereby penetrate better into the wick and enables better burning behavior. The wick is also more gently prepared, that is, impregnated, by means of the method according to the invention.

The pass-through speed in step a) is further preferably a maximum of 250 m/min, preferably a maximum of 225 m/min, and more preferably a maximum of 200 m/min. The pass-through speed is preferably 190 m/min.

The tension of the wick in step a) is preferably 0.1 kg to 3.0 kg, more preferably 0.5 kg to 2.5 kg, and still more preferably 1.0 kg to 2.0 kg.

The relative humidity in step b) is preferably between 5 and 25%, preferably between 10 and 20%, and more preferably between 10 and 15%.

The drying duration in step b) is at least 1 h, preferably at least 1.5 h, and more preferably at least 2 h.

The wick is preferably waxed after the drying step c). It is thereby ensured that the wick can be introduced into the candle material when the candle is produced and that said wick is immediately supplied with wax when ignited.

A further step can also be performed before step a). In said upstream step, the wick is plaited.

If the wick is not waxed directly after the drying step c), then the prepared and dried wick is wound onto a device, preferably a paper sleeve, after the drying step c).

According to a preferred embodiment, the impregnating solution according to the invention is used in step a). The information provided above about the impregnating solution according to the invention applies to said preferred embodiment of the method according to the invention as well.

The invention further relates to a method for impregnating a wick with the impregnating solution according to the invention, comprising the steps
  a) passing the wick through the impregnating solution according to the invention at a speed of at least 100 m/min, preferably at least 140 m/min, and more preferably at least 180 m/min, wherein the dwell time of the wick in the impregnating solution is at least 0.5 seconds or more, preferably 0.7 seconds or more, and more preferably 0.8 seconds or more;
  b) winding up the impregnated wick onto a drying device.

By means of the method according to the invention, it is possible to impregnate a wide variety of wick materials sufficiently with an impregnating solution.

The method according to the invention allows extended dwell time of the wick in the impregnating solution. The impregnating solution can thereby penetrate better into the wick and enables better burning behavior. The wick is also more gently prepared, that is, impregnated, by means of the method according to the invention.

The pass-through speed in step a) is further preferably a maximum of 250 m/min, preferably a maximum of 225 m/min, and more preferably a maximum of 200 m/min. The pass-through speed is preferably 190 m/min.

The tension of the wick in step a) is preferably 0.1 kg to 3.0 kg, more preferably 0.5 kg to 2.5 kg, and still more preferably 1.0 kg to 2.0 kg.

The relative humidity in step b) is preferably between 5 and 25%, preferably between 10 and 20%, and more preferably between 10 and 15%.

The drying duration in step b) is at least 1 h, preferably at least 1.5 h, and more preferably at least 2 h.

The wick is preferably waxed after the drying step c). It is thereby ensured that the wick can be introduced into the candle material when the candle is produced and that said wick is immediately supplied with wax when ignited.

A further step can also be performed before step a). In said upstream step, the wick is plaited.

If the wick is not waxed directly after the drying step c), then the prepared and dried wick is wound onto a device, preferably a paper sleeve, after the drying step c).

According to a preferred embodiment, the impregnating solution according to the invention is used in step a). The information provided above about the impregnating solution according to the invention applies to said preferred embodiment of the method according to the invention as well.

Further advantages of the invention are found in the description of preferred embodiment examples below, and such examples are in no way limiting. All embodiments of the invention can be combined with each other within the scope of the invention.

EMBODIMENT EXAMPLES

Materials

Ammonium nitrate, ammonium sulfate, sodium sulfate, and magnesium sulfate heptahydrate were purchased from the company VWR (Germany).

Cerium nitrate was purchased from the company Thermofisher (Belgium).

Exolit AP420 and Exolit 855 were purchased from the company Clariant Produkte (Deutschland) GmbH.

BYK-154 was purchased from the company Krahn Chemie Deutschland GmbH.

EUCAM-Textil was purchased from the company Endotherm Brandschutz (Saarbrucken, Germany).

Test Procedure

Eight impregnating solutions according to the invention were produced, having the compositions shown in Table 1. All impregnating solutions are aqueous solutions.

TABLE 1

Boron-free impregnating solutions for wicks

| Substances | 1 | 2 | 3 | 4 | 5 | 6 | 7 | 8 | 9 |
|---|---|---|---|---|---|---|---|---|---|
| Water | 250.0 g | 250.0 g | 250.0 g | 250.0 g | 250.0 g | 250.0 g | 250.0 g | 250.0 g | 250.0 g |
| Exolit AP420 | 2.0 g | 2.0 g | 2.0 g | 2.0 g | 2.0 g | 2.0 g | — | — | — |
| Ammonium nitrate | 10.0 g | 7.0 g | 1.5 g | 10.0 g | 10.0 g | 10.0 g | — | — | — |
| Ammonium sulfate | 10.0 g | 7.0 g | 1.5 g | 5.0 g | 5.0 g | 7.5 g | — | — | — |
| Cerium nitrate | 2.0 g | 1.0 g | 0.5 g | 10.0 g | 1.3 g | 1.0 g | — | 4.1 g | — |
| EUCAM-Textil | — | — | — | — | — | — | 150.0 g | 312.5 g | — |
| BYK-154 | — | — | — | — | — | — | 2.0 g | 4.1 g | — |
| MgSCO*7 H$_2$O | — | — | — | — | — | — | 2.0 g | 4.1 g | — |
| Exolit 855 | — | — | — | — | — | — | — | — | 20.0 g |

The wick material was dipped in the impregnating solution according to the invention for approximately 1 second and then wiped off manually. The wicks were then dried overnight while hanging at room climate conditions.

Wick wax was heated to 90° C. and stirred once said wax was fully melted. The wicks were immersed for approximately 2 seconds, until no more air bubbles arose. Excess wax was wiped off manually.

The wicks obtained were then inserted into candle blanks and cut off straight with protrusion.

The wick prepared with an impregnating solution according to example 1 was inserted into a tea light candle blank made of paraffin and a tea light candle blank made of a mixture of paraffin and palm wax.

The wick prepared with an impregnating solution according to example 2 was inserted into a tea light candle blank made of paraffin.

The wick prepared with an impregnating solution according to example 3 and made of an unbleached wick yarn was inserted into a tea light candle blank made of paraffin.

The wick prepared with an impregnating solution according to example 4 was inserted into a fragrance candle blank made of paraffin and having 10% fragrance content.

The wick prepared with an impregnating solution according to example 5 was inserted into a pillar candle blank made of paraffin.

The wick prepared with an impregnating solution according to example 6 was inserted into a pillar candle blank made of paraffin and a taper candle blank made of paraffin.

The wick prepared with an impregnating solution according to example 7 was inserted into a pillar candle blank made of stearin.

The wick prepared with an impregnating solution according to example 8 was inserted into a pillar candle blank made of stearin and a pillar candle blank having a mixture of stearin and palm wax.

The wick prepared with an impregnating solution according to example 9 was inserted into a candle in glass made of a mixture of various natural waxes.

Burning tests were performed on all wicks impregnated with impregnating solutions according to the invention according to examples 1 through 9.

For the burning tests, the ambient temperature was at least 15° C. and there was no air draft.

The burning behavior and curvature of the wick were checked 1 h after igniting.

The burning behavior of all wicks was good and met the requirements of RAL-GZ 041. The wicks stood up straight out of the wax and had a curvature between 45° and 90°.

The invention claimed is:

1. A boron-free wick, comprising
   a) a wick material,
   the wick material being selected from cotton, rayon staple, cellulose fibers, paper yarn, linen yarn, and/or combinations thereof;
   b) at least one first flame retardant; and
   c) at least one first additive, the first additive being selected from the group consisting of ammonium nitrate, cerium nitrate, a polymer, and combinations thereof,
   wherein the proportion of the first additive is 0.001 to 4.0 weight % relative to the total amount of the wick; and
   wherein the boron-free wick further comprises a second additive, wherein the second additive is an inorganic nitrate, and the second additive is selected from the group consisting of ammonium nitrate and cerium nitrate, and wherein the second additive is different from the first additive.

2. The boron-free wick according to claim 1,
   wherein the at least one first additive is ammonium nitrate or cerium nitrate; and/or
   wherein the at least one first additive is an organic polymer; and/or
   wherein the proportion of the first additive is 0.01 to 4.0 weight % relative to the total amount of the wick.

3. The boron-free wick according to claim 1,
   or
   wherein the second additive is ammonium nitrate.

4. The boron-free wick according to claim 1,
   wherein the boron-free wick comprises an inorganic sulfate; or wherein the boron-free wick comprises an inorganic sulfate; wherein the proportion of inorganic sulfate is from 0.001 to 10 weight % relative to the total amount of the wick.

5. The boron-free wick according to claim 1,
wherein the at least one flame retardant is an inorganic phosphorus substance.

6. The boron-free wick according to claim 1.

7. The candle according to claim 6,
wherein the candle is made of paraffin, stearin of animal and/or vegetable origin, beeswax, palm wax, soy wax, fats of animal or vegetable origin, and/or combinations thereof.

8. A method for impregnating a wick with a boron-free impregnating solution for a wick, wherein the impregnating solution comprises, a solvent, at least one first flame retardant; and at least one first additive, the first additive being selected from the group consisting of ammonium nitrate, cerium nitrate, a polymer, and combinations thereof,
comprising the steps
a) passing the wick through the impregnating solution at a speed of at least 100 m/min, wherein the dwell time of the wick in the impregnating solution is at least 0.5 seconds or more;
b) winding up the impregnated wick onto a drying device; wherein the boron-free impregnating solution comprises a second additive, wherein the second additive of the boron-free impregnating solution is an inorganic nitrate, and the second additive is selected from the group consisting of ammonium nitrate and cerium nitrate, and wherein the second additive is different from the first additive.

9. The method according to claim 8,
wherein the relative humidity in step b) is between 5 and 25%.

10. The method according to claim 8,
wherein the at least one first additive of the boron-free impregnating solution is ammonium nitrate or cerium nitrate; and/or
wherein the at least one first additive of the boron-free impregnating solution is an organic polymer; and/or
wherein the solvent of the boron-free impregnating solution is water.

11. The method according to claim 8,
wherein the second additive of the boron-free impregnating solution is ammonium nitrate.

12. The method according to claim 8,
wherein the boron-free impregnating solution comprises an inorganic sulfate; or
wherein the boron-free impregnating solution comprises an inorganic sulfate, wherein the proportion of inorganic sulfate is from 0.1 to 20 weight % relative to the total amount of impregnating solution.

13. The method according to claim 8,
wherein the at least one flame retardant of the boron-free impregnating solution is an inorganic phosphorus substance; and/or
wherein the proportion of the first additive of the boron-free impregnating solution is from 0.1 to 10 weight % relative to the total amount of impregnating solution.

* * * * *